(12) United States Patent
Hejazi

(10) Patent No.: US 9,990,684 B2
(45) Date of Patent: Jun. 5, 2018

(54) MAILPORT FOR AUTOMATED PARCEL CARRIERS

(71) Applicant: Sammy Hejazi, Lafayette, CO (US)

(72) Inventor: Sammy Hejazi, Lafayette, CO (US)

( * ) Notice: Subject to any disclaimer, the term of this patent is extended or adjusted under 35 U.S.C. 154(b) by 1071 days.

(21) Appl. No.: 14/267,779

(22) Filed: May 1, 2014

(65) Prior Publication Data
US 2015/0317596 A1    Nov. 5, 2015

(51) Int. Cl.
*G06Q 50/28* (2012.01)
*G06Q 10/08* (2012.01)
*G06Q 50/32* (2012.01)

(52) U.S. Cl.
CPC ........... *G06Q 50/28* (2013.01); *G06Q 10/083* (2013.01); *G06Q 50/32* (2013.01)

(58) Field of Classification Search
CPC ....... G06Q 50/28; G06Q 10/083; G06Q 50/32
See application file for complete search history.

(56) References Cited

U.S. PATENT DOCUMENTS

| | | | | |
|---|---|---|---|---|
| 5,212,649 A * | 5/1993 | Pelletier | ................. | G06Q 10/08 221/120 |
| 5,385,265 A * | 1/1995 | Schlamp | ................. | G07F 7/00 221/131 |
| 5,716,032 A | 2/1998 | McIngvale | | |
| 6,690,997 B2 * | 2/2004 | Rivalto | ................. | G06Q 10/08 700/237 |
| 7,086,198 B2 * | 8/2006 | Hayden | ................. | G07F 11/54 221/119 |
| 7,857,161 B2 * | 12/2010 | Pinney | ................. | G06F 19/3462 221/10 |
| 7,925,375 B2 * | 4/2011 | Schininger | ............ | G07F 11/007 221/131 |
| 8,145,351 B2 * | 3/2012 | Schininger | ................ | E05G 1/06 221/12 |
| 9,135,403 B1 * | 9/2015 | Tolmosoff | ........... | G06F 19/3462 |
| 9,783,297 B2 * | 10/2017 | Patrick | ..................... | B64D 1/12 |
| 2001/0034665 A1 * | 10/2001 | Kinory | .................. | G06Q 10/08 705/26.1 |
| 2008/0078707 A1 * | 4/2008 | Wattawa | .................. | B07C 7/00 209/630 |

(Continued)

FOREIGN PATENT DOCUMENTS

| | | |
|---|---|---|
| JP | 11137408 A | 5/1999 |
| JP | 2008080300 A | 4/2008 |
| WO | 081755 A1 | 6/2012 |

OTHER PUBLICATIONS

"Delivery Service Review: Amazon Locker", published by eCommPoint.com, on Mar. 18, 2013, p. 1-3 (Year: 2013).*

*Primary Examiner* — Kevin H Flynn
*Assistant Examiner* — Omar Zeroual
(74) *Attorney, Agent, or Firm* — Wiley Rein LLP

(57) ABSTRACT

A Mailport that solves a variety of problems caused by the proliferation of Automated Parcel Carriers, including unmanned aerial vehicles ("UAVs"). The preferred embodiment of the invention features an access aperture designed to retrieve and transfer packages to and from Automated Parcel Carriers. The preferred embodiment of the invention also features a storage area for parcels, and a secured aperture to enable intended recipients to receive or send Parcels as appropriate. Various embodiments of the invention may stand alone or otherwise integrate within the structure of a building.

22 Claims, 10 Drawing Sheets

(56) References Cited

U.S. PATENT DOCUMENTS

| | | | |
|---|---|---|---|
| 2012/0143482 A1* | 6/2012 | Goossen | G08G 5/0034 701/120 |
| 2013/0240673 A1* | 9/2013 | Schlosser | G05D 1/101 244/137.1 |
| 2014/0014008 A1* | 1/2014 | Tompkins | E05G 1/02 109/23 |
| 2014/0032034 A1* | 1/2014 | Raptopoulos | G08G 5/0069 701/25 |
| 2015/0106294 A1* | 4/2015 | Robinson | G06F 21/62 705/339 |
| 2015/0120094 A1* | 4/2015 | Kimchi | B64C 39/024 701/3 |
| 2015/0158599 A1* | 6/2015 | Sisko | B64F 1/32 244/114 R |
| 2015/0175276 A1* | 6/2015 | Koster | B64F 1/32 244/114 R |
| 2017/0255896 A1* | 9/2017 | Van Dyke | G06Q 10/083 |
| 2017/0328391 A1* | 11/2017 | Matsuda | F16B 2/22 |
| 2017/0349376 A1* | 12/2017 | Porat | B65G 1/1378 |

* cited by examiner

MAILPORT FOR AUTOMATED PARCEL CARRIERS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

CERTIFICATE OF TRANSMISSION

I hereby certify that this correspondence, which includes 30 pages of Specification and 11 sheets of Drawings, is being electronically deposited with the United States Patent & Trademark Office, EFS-Web filing portal under 37 C.F.R. 1.8, addressed to: Commissioner for Patents, on the date shown below.
/*Jeffrey R. Schell*/ Date of Electronic Transmission: May 1, 2014
WITNESS: Jeffrey R. Schell

BACKGROUND OF THE INVENTION

The processes associated with the delivery of mail and other packages have traditionally been performed by human carriers. Recent developments have enabled mail, packages and other cargo to instead be delivered by Automated Parcel Carriers, including but not limited to unmanned aerial vehicles, unmanned ground vehicles, or unmanned aquatic vehicles, or a combination of both human and Automated Parcel Carriers. The use of Automated Parcel Carriers demonstrates promising improvements in the fields of logistics and Parcel delivery. Some notable opportunities associated with Automated Parcel Carriers include decreases in the costs associated with delivery and increases the number of packages that can be accurately delivered in a day.

However, along with the opportunities associated with Automated Parcel Carriers come a number of new problems. For instance, Automated Parcel Carriers and human Parcel carriers have different requirements for interfacing with a Parcel receptacle system, such as a mailbox. The traffic associated with Automated Parcel Carriers, including in particular Automated Parcel Carriers associated with unmanned aerial vehicles, presents a hazard to humans, animals, and property. Moreover, the additional traffic associated with Automated Parcel Carriers presents an annoyance and can mar the aesthetics of a neighborhood or surrounding buildings. Such hazards and annoyances associated with Automated Parcel Carriers become exacerbated when cargo is delivered to each of the doorsteps of homes or offices in an urban or suburban environment.

SUMMARY OF THE INVENTION

The origin of the preferred embodiment of the invention is the discovery that populated areas will be safer and unpestered by an Automated Parcel Carrier or a plurality of Automated Parcel Carriers, including unmanned aerial vehicles ("UAVs"), especially for example UAVs carrying a Parcel or a plurality of Parcels, when such an Automated Parcel Carrier or plurality of Automated Parcel Carriers have a centralized unit that can receive and redistribute a Parcel or a plurality of Parcels, such as mail and other packages, to the appropriate recipient. As used herein, "Automated Parcel Carrier" or "APC" refers to an unmanned delivery vehicle carrying or capable of carrying and transporting a Parcel or a plurality of Parcels.

At the heart of the present invention is a Parcel receptacle featuring an access interface for Automated Parcel Carriers and one or more apertures for Parcel transfer, hereinafter referred to as a "Mailport." In the preferred embodiment of the invention, the Mailport incorporates a docking system to accommodate an Automated Parcel Carrier during landing, docking and/or Parcel transfer procedures. In the preferred embodiment of the invention, the Mailport accommodates a redistribution apparatus for the transfer of parcels. In the preferred embodiment of the invention, the Mailport is also designed to accommodate a plurality of unique human or machine users who can access the Mailport via one or more apertures with user-specific access codes or keys.

The preferred embodiment of the present invention allows for an Automated Parcel Carrier to attend to the business of delivering and receiving Parcels without the risks associated with direct contact between Automated Parcel Carriers and humans. In the processes of delivery to the Mailport by the Automated Parcel Carrier, Parcel drop-offs may occur out of the sight or physical reach of humans. This allows for prevention of theft, as humans who are inclined to steal the packages cannot see and/or otherwise do not have access to the Parcels carried by the Automated Parcel Carrier during processes associated with the preferred embodiment of the invention. This also allows for increased privacy, as Parcels delivered into the unit by an automated carrier are shielded from observation. An embodiment of the invention features a landing area for an Automated Parcel Carrier located on top of the Mailport, out of reach of humans.

In the preferred embodiment of the invention, an Automated Parcel Carrier can unload cargo into the Mailport for future pickup by the recipient or another human or machine carrier. The inventor has discovered and solved a need to enable an Automated Parcel Carrier to place a Parcel in a secured container for subsequent access to the Parcel by the intended recipient of the Parcel. The inventor has also discovered and solved a need to enable an Automated Parcel Carrier to place a Parcel in a secured container for subsequent access to the Parcel by an Automated Parcel Carrier in association with future delivery of the Parcel to another location.

As such, the preferred embodiment of the present invention features a Mailport that is accessible by both Automated Parcel Carriers and human carriers to accomplish processes associated with the delivery of a Parcel, whether for inbound Parcel delivery for pickup at said Mailport, or temporary storage within said Mailport in support of logistical procedures associated with pickup by a machine carrier, such as an Automated Parcel Carrier, or a human carrier at a later time for further outbound delivery. Further, in the preferred embodiment the invention is accessible by both non-human Parcel recipients and human recipients for Parcel pickup.

REFERENCE NUMERALS IN THE DRAWINGS

Figure 1:
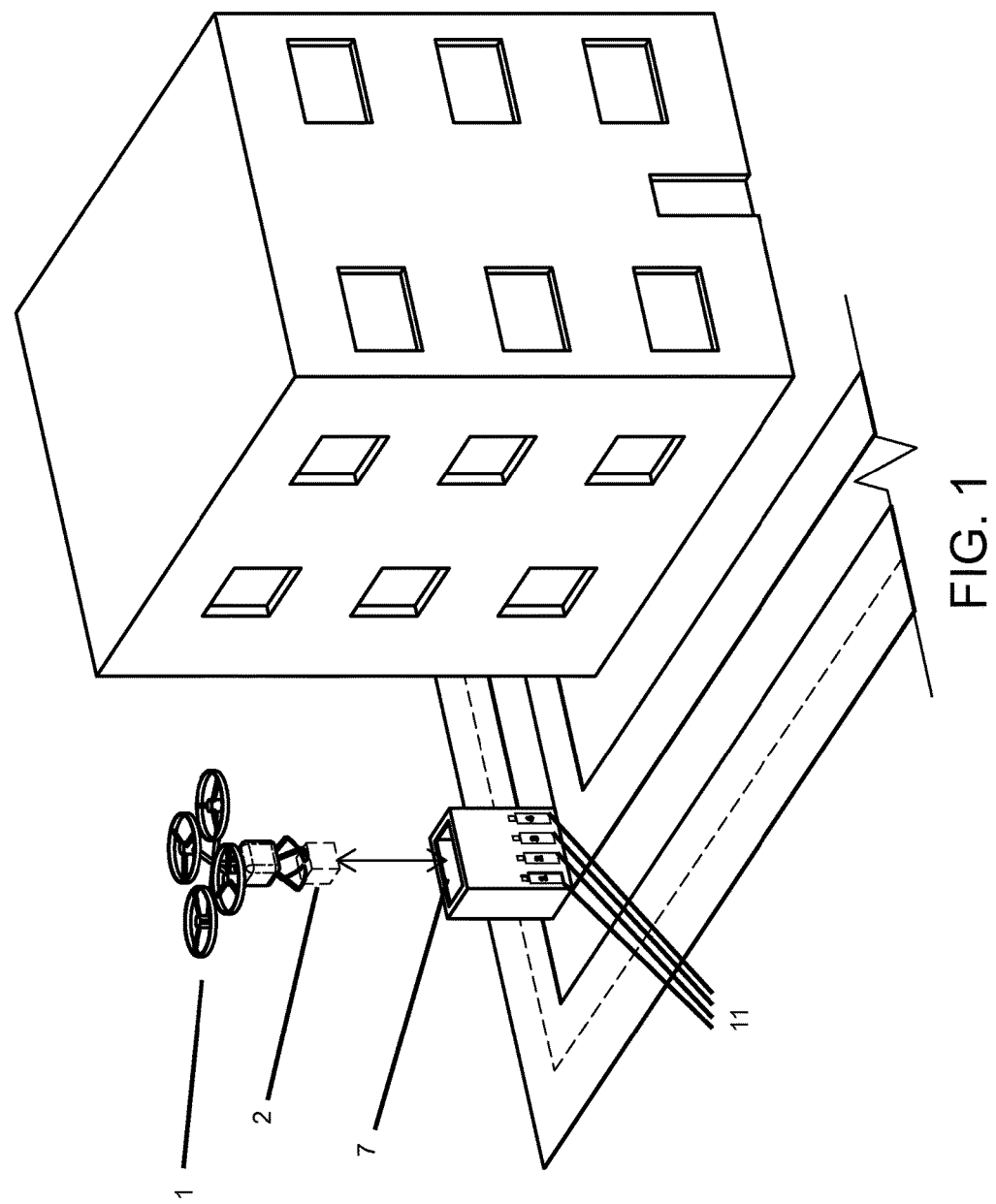
FIG. 1: a view of the preferred embodiment of the invention outside of a building.

1. Automated Parcel Carrier
2. Parcel
3. Inbound/Outbound (I/O) Receptacle
4. User Receptacle
5. Translocator Receptacle
6. Landing Pad
7. APC Access for transfer of a parcel or plurality of parcels to and from an Automated Parcel Carrier
8. Parcel Holding Area
9. Multi-user opening access point for transfer of a parcel or plurality of parcels to and from a user
10. Storage unit accessible to a user located within a building
11. User Receptacles, in an embodiment of the invention having multiple User Receptacles
12. Enclosed Space
13. Automated Parcel Carrier Recharging Unit
14. Robotic Maintenance Arm
15. Robotic Internal Transfer Arm

DETAILED DESCRIPTION OF THE INVENTION

Human mail carriers have traditionally been employed to sort, carry, and distribute Parcels to recipients as well as to pickup of Parcels for further delivery, including for the purpose of, for example, returning a purchased item to a seller. In some cases, the human mail carrier delivers a Parcel or a plurality of Parcels directly to the recipient, at a specified location and/or at a specified time. In other cases, the process of human-to-human delivery takes place asynchronously, such as when Parcel is left by a human mail carrier in a designated location for the recipient to subsequently retrieve.

An apparatus associated with asynchronous human-to-human delivery processes is the outdoor centralized multi-receptacle mailbox such as a Cluster Box Unit or CBU. Such outdoor centralized mailboxes are commonly used in high-density neighborhoods such as townhouse communities. Offices, apartment complexes, and condominiums often have centralized mailbox units that are accessible only inside the building.

The prior art includes a wide variety of mailboxes, including outdoor centralized mailboxes, that are designed for use by human carriers and human recipients. The use of an Automated Parcel Carrier 1 in the distribution of a Parcel 2 or a plurality of Parcels will render many, if not all traditional mailboxes obsolete. An Automated Parcel Carrier 1 will encounter numerous challenges in interfacing with mailboxes that have been designed for humans. The present invention differs from the prior art by incorporating solutions to such challenges.

The challenges an Automated Parcel Carrier 1 will encounter during interface with mailboxes designed for humans are many fold. In asynchronous human-to-human delivery processes, for instance, packages sometimes arrive unexpectedly. The intended recipient may find the package waiting for her at a delivery location, without any knowledge that the package would arrive. In other circumstances, the intended recipient will find a note announcing that the package cannot be delivered. Human carriers use human decision-making processes, which may exceed the bounds of replicable algorithms, to choose to deliver or not to deliver packages for a variety of reasons. Such a human decision making process is evidenced when a person engages in subjective analysis to determine that a package is likely to be stolen by a suspicious looking person meandering about near a delivery location. Such a process, with reasoning based on any number of variables, would not likely be easily programmed into a machine delivery mechanism, intended as a substitute for a human carrier, making alternative solutions, such as those incorporated into embodiments of the present invention, preferable.

A variety of other challenges that an Automated Parcel Carrier 1 may face have been left to the present inventor to solve. For instance, examples of such challenges include the following: a Parcel or a plurality of Parcels may require a signature to be released to a recipient; an unattended delivery is at risk of theft; a Parcel or a plurality of Parcels left in a visible location may alert potential intruders that a home is vacant for a few days at a time if the package recipient does not pick up the delivery in a timely manner; a Parcel or a plurality of Parcels left exposed to the elements can be damaged if it begins to rain or snow; on sunny days, packages may overheat; etc. Embodiments of the present invention solve these challenges.

At the heart of the preferred embodiment of the present invention, therefore, is a Mailport that solves such challenges. In the preferred embodiment of the invention, the Mailport acts as a centralized Parcel receptacle and distribution apparatus, providing secured, individualized access for one or many human and/or machine users. This mechanism is combined with a docking mechanism to enable an Automated Parcel Carrier 1 to link with the Mailport and offload or retrieve a Parcel 2 or a plurality of Parcels. As used herein, a "Parcel" is defined as an object or collection of objects having a designated destination or destinations. The Parcel 2 typically comprises a containment object, such as a box, postal package, envelope, tape, adhesive, wrapping, plastic or other such mechanism designed to enclose space and/or objects during transportation.

The preferred embodiment of the invention includes one Inbound/Outbound receptacle or a plurality of Inbound/Outbound receptacles 3, hereinafter referred to in the singular as an "I/O Receptacle". In the preferred embodiment of the invention, a I/O Receptacle 3 is a enclosed container with a door having a standardized size to enable the Mailport to accommodate a Parcel 2 or a plurality of Parcels of standardized sizes. In the preferred embodiment of the invention, I/O Receptacles 3 are accessed Automated Parcel Carriers. A Mailport may also include any number of User Receptacles 4 specifically designed to be accessible by human and non-human recipients to enable users to access a Parcel 2 or a plurality of Parcels on an individualized basis (hereinafter referred to in the singular as a "User Receptacle" and in the plural as "User Receptacles"). Access to any such User Receptacle 4 may be provided to human users by properly interacting with an electronic keypad located on or near the exterior side of the Mailport, which enables human user input of a code. When the correct code is entered, an exterior door is opened providing access to said User Receptacle 4. Alternative embodiments may include other electronic security means for access by machine users, such as an Automated Parcel Carrier 1. In an embodiment of the invention, an Automated Parcel Carrier 1 may transmit a wireless signal to the Mailport to open an exterior door to provide access to a I/O Receptacle 3.

Figure 4A:
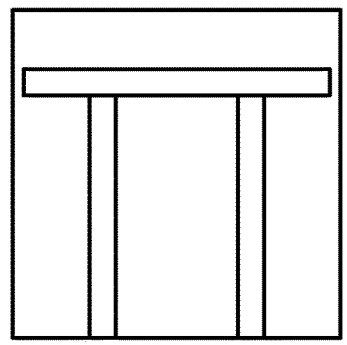
FIG. 4A: a side view of the Translocator Receptacle in an embodiment of the invention in the "lift" position.
Figure 4B:
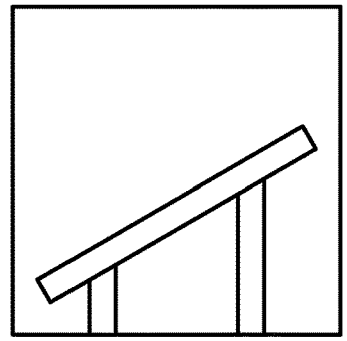
FIG. 4B: a side view of a receptacle or Translocator Receptacle in an embodiment of the invention in the "dump" position.
Figure 4C:
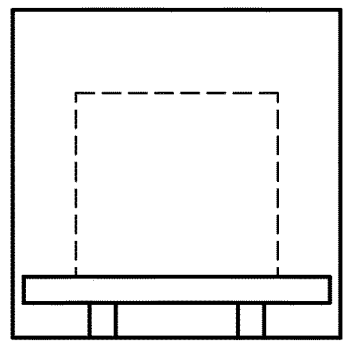
FIG. 4C: a side view of a receptacle or Translocator Receptacle in an embodiment of the invention in the "flat" position, additionally depicting a parcel contained within the receptacle or Translocator Receptacle.
Figure 5:
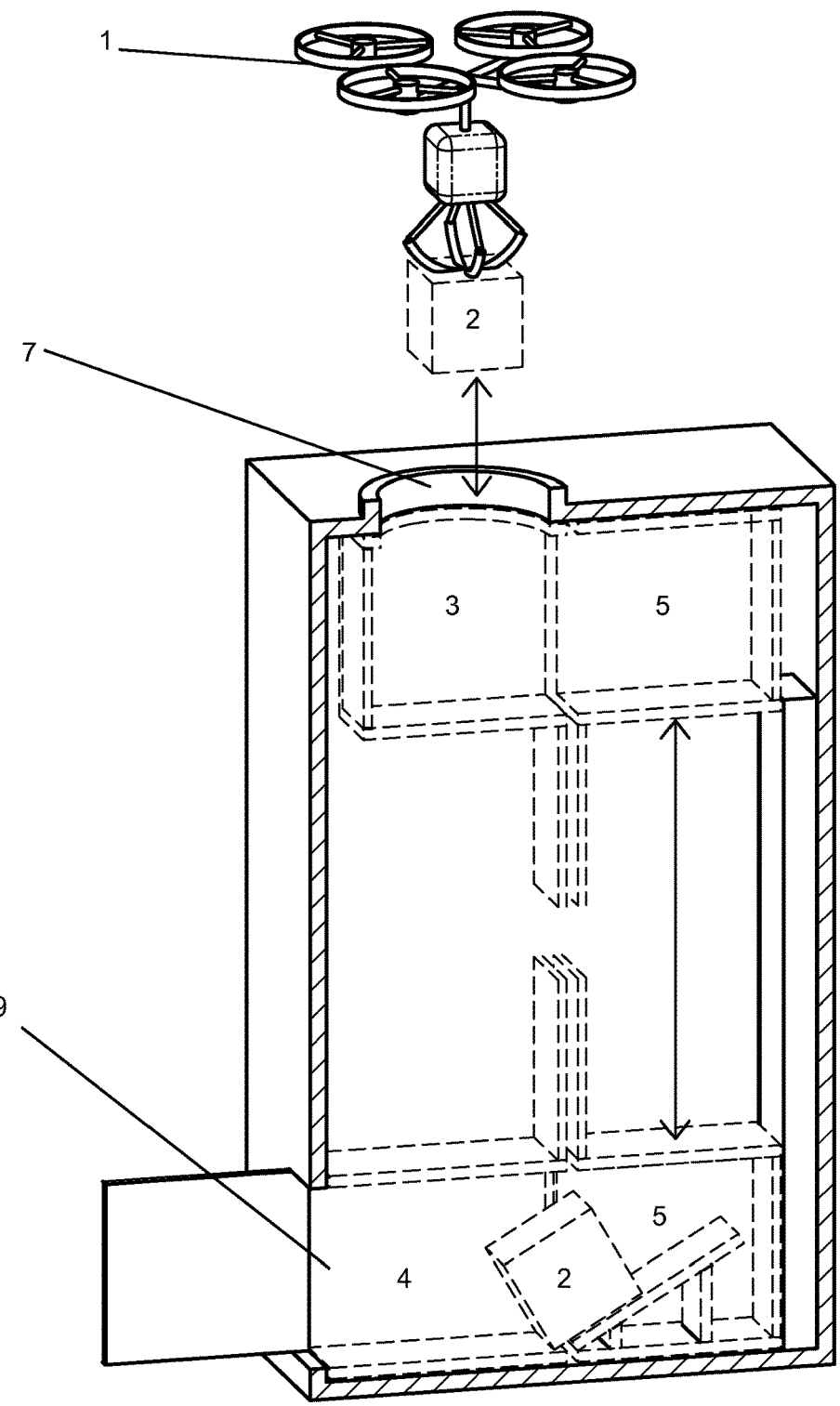
FIG. 5: a side slice view of a preferred embodiment of the invention, additionally comprising a Translocator Receptacle in two distinct positions wherein the Translocator Receptacle in the bottom position is placed in the "dump" position to transfer a parcel into a User Receptacle.

In the preferred embodiment of the invention, each receptacle may further incorporate interior machinery to move the floor into "flat," "lift," and "dump" positions, illustrated by FIG. 4. In the "lift" position, as illustrated by FIG. 4A, the floor is raised near the top of the receptacle to enable transfer of a Parcel 2 into or out of the receptacle via an aperture at or near the ceiling of the I/O Receptacle 3. In the "dump" position, as illustrated by FIG. 4B, the floor is maintained at a sloping angle to facilitate sliding a Parcel 2 out of the I/O Receptacle 3, User Receptacle 4, or Translocator Receptacle 5 through an aperture located on one of the side walls of the I/O Receptacle 3, User Receptacle 4 or Translocator Receptacle 5, as illustrated by FIG. 5. In the "flat" position, as illustrated by FIG. 4C, the I/O Receptacle 3, User Receptacle 4, or Translocator Receptacle 5 floor remains at the bottom of the I/O Receptacle 3, User Receptacle 4, or Translocator Receptacle 5, respectively, maximizing the space available for a Parcel 2 contained by the I/O Receptacle 3, User Receptacle 4, or Translocator Receptacle 5.

The use of an Automated Parcel Carrier 1 in the delivery of a Parcel 2 or a plurality of Parcels adds potential hazards and annoyances to neighborhoods, office communities and public space in general. Deliveries or retrievals conducted by an Automated Parcel Carrier 1 or Automated Parcel Carriers can increase unmanned vehicular traffic causing collisions, damage, frustration, injury, and death. The preferred embodiment of the invention aims to create a functional central location where deliveries from an Automated Parcel Carrier 1 or Automated Parcel Carriers can occur away from the immediate living and working spaces near homes and offices.

The preferred embodiment of the invention comprises a free-standing, outdoors unit, as illustrated by FIG. 1. It incorporates an APC Access 7 with optional landing pad 6, where UAVs are able to dock to unload or retrieve a Parcel 2 or a plurality of Parcels. Hereinafter, the "APC Access" is defined as a designated location to accommodate an unmanned vehicle for loading or unloading a Parcel 2 or a plurality of Parcels. The "Access Aperture" as used here is defined as an opening to accommodate the transfer of Parcel or plurality of Parcels. In the preferred embodiment of the invention, the Access Aperture is located in the vicinity of the APC Access 7 to facilitate transfer of Parcel or a plurality of Parcels from the Automated Parcel Carrier to the I/O Receptacle. The APC Access can take on various forms, such as for example, a landing pad 6 with an appropriate Access Aperture to accommodate an aerial vehicle and its Parcel, or a docking claw with an appropriate Access Aperture to accommodate an underwater submersible and its Parcel. In the preferred embodiment illustrated by FIG. 2, the APC Access takes the form of a landing pad 6, configured to accommodate a variety of Automated Parcel Carrier 1 configurations and sizes for Parcel 2 transfer into and out of the vicinity of the Mailport. In the preferred embodiment of the invention, a Parcel 1 enters or exits the Mailport through an APC Access 7 that can accommodate various sizes of Parcels. In other embodiments of the invention, the Mailport will allow human and machine users to both receive and send Parcels.

Figure 3:
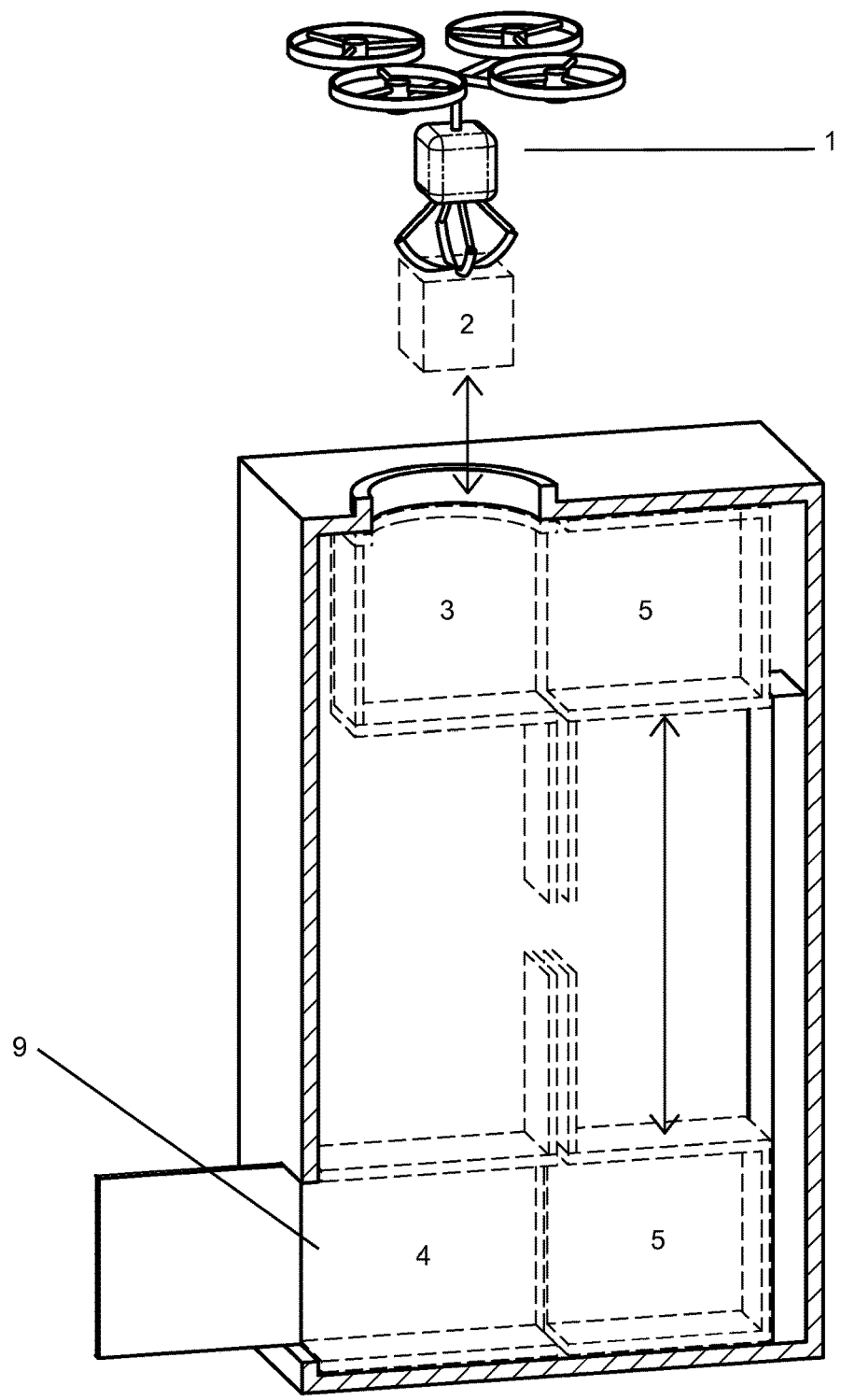
FIG. 3: a side slice view of a preferred embodiment of the invention, additionally comprising a Translocator Receptacle, displayed for example purposes only in two positions, though the preferred embodiment of the invention incorporates only one Translocator Receptacle.

The transfer of a Parcel 2 or a plurality of Parcels to and from different parts of Mailport, and to and from multiple locations within the Mailport, is accomplished by a "Translocator Receptacle" 5 or a plurality of "Translocator Receptacles" in the preferred embodiment of the invention. As referred to herein, a Translocator Receptacle delivers Parcels or a plurality of Parcels between two or more I/O Receptacles, two or more User Receptacles, two or more Holding Receptacles, or a combination thereof. In the preferred embodiment, as illustrated in FIG. 3, the Translocator Receptacle is an enclosed box that transfers the Parcel between the I/O Receptacle 3 and User Receptacle 4. It is important to note that the other embodiments of a Translocator Receptacle can take the form of, but are not limited to, a railed receptacle, shaft, slide, mechanical conveyor belt, or Robotic Internal Transfer Arm 15 that delivers a Parcel between two receptacles. The Translocator Receptacle 5 may be located within or outside of the Mailport unit in various embodiments of the invention.

Figure 7:
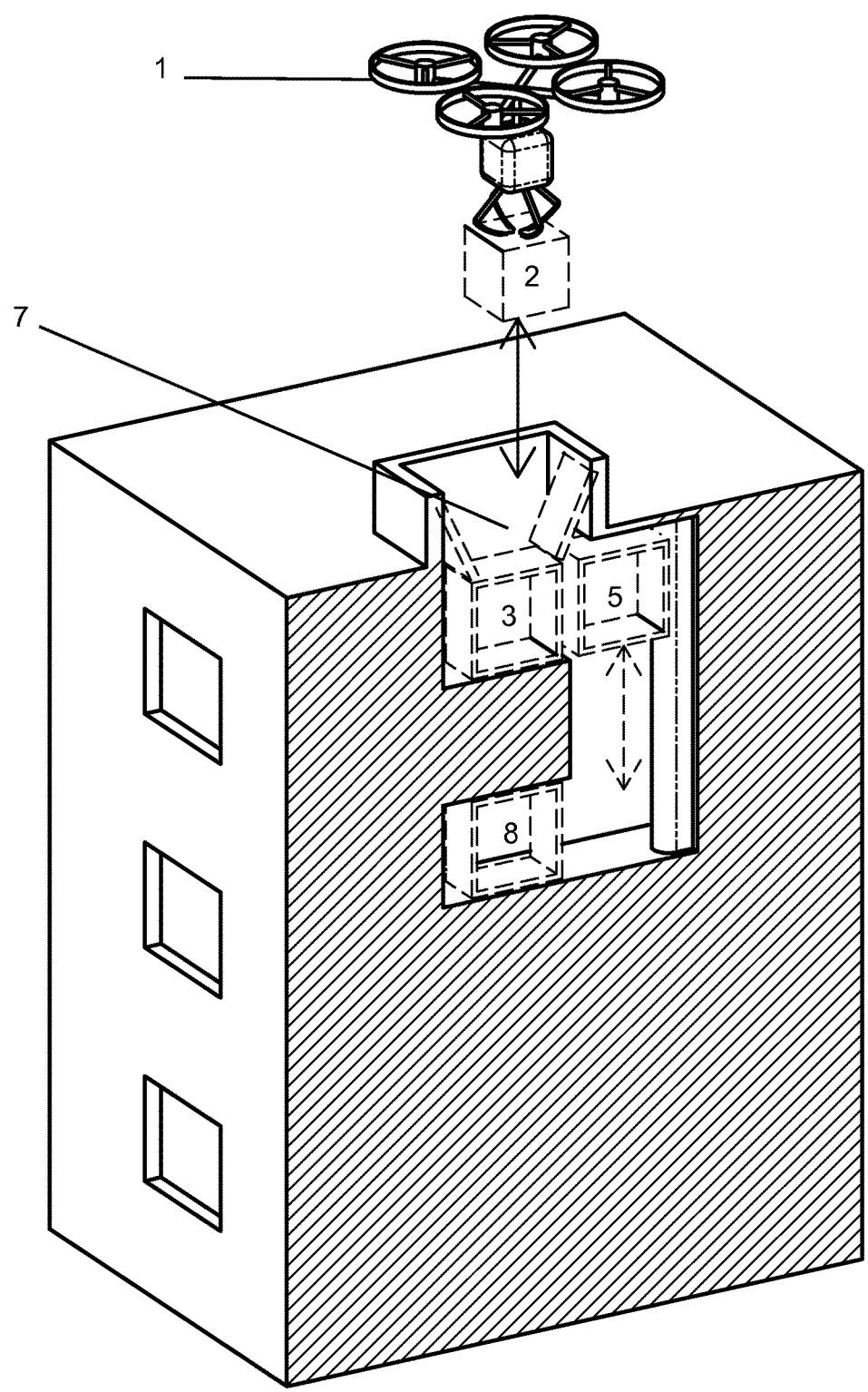
FIG. 7: an angular slice view of an embodiment of the invention integrated into a building.

In the preferred embodiment of the invention, the Translocator Receptacle 5 may physically move between a designated collection location and a designated delivery location if they are not located in the same place. An embodiment of the invention may include a Translocator Receptacle that travels vertically between the I/O Receptacle 3 and a User Receptacle 4 by moving on rails (FIG. 3). Said rails may be located within a shaft designated for Parcel transport via the Translocator Receptacle 5 inside of a building. Designated collection locations and designated delivery locations may be integrated within the Mailport unit itself, in embodiments designed to allow an Automated Parcel Carrier 1 to deliver a Parcel 2 directly to the Mailport unit (FIG. 3), as opposed to, for example, when the APC Access 7 is at a distant location with respect to the User Receptacle (FIG. 7). In embodiments where the Automated Parcel Carrier 1 landing site and components of the Mailport are in distinct locations, the Translocator Receptacle 5 may additionally retrieve or deliver Parcels 2 throughout the different areas of the Mailport, such as for example, across distinct floors, as illustrated in FIG. 7.

Figure 8:
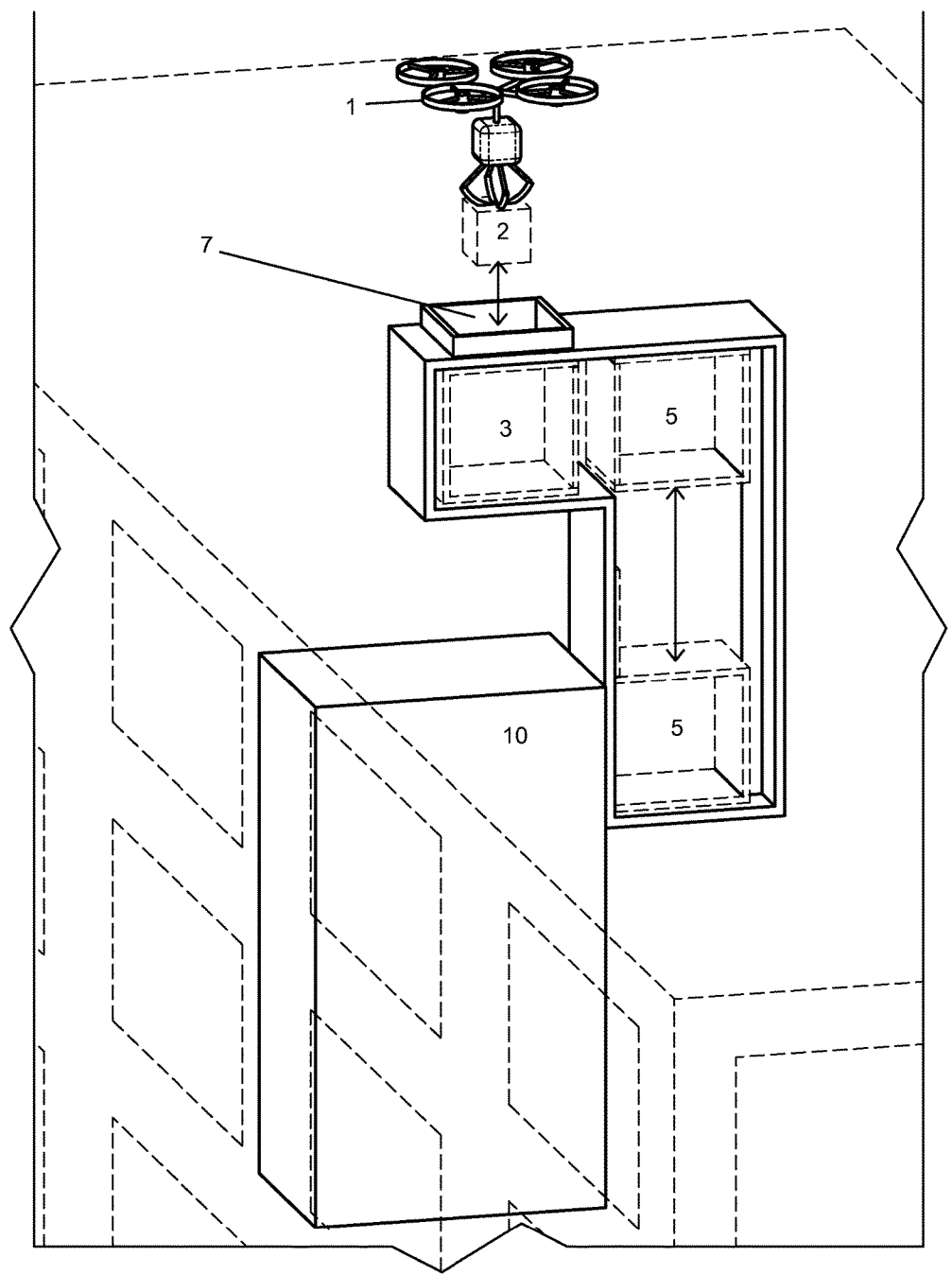
FIG. 8: a side slice view of an embodiment of the invention integrated into a building.

An embodiment of the invention features a Mailport that is directly integrated with a building, as illustrated in FIG. 8. The APC Access 7 to such a Mailport may be incorporated into or located on the top side of a building, such as on the roof. This direct integration of a Mailport within a building allows intended users access to delivered Parcels and a receptacle to send Parcels without leaving the building. It also allows an Automated Parcel Carrier 1 to distribute Parcels to recipients without entering a building. A Mailport can be stationed anywhere inside the building where an Automated Parcel Carrier 1 can access it. In an embodiment of the invention, the APC Access 7 through which the Automated Parcel Carrier 1 distributes a Parcel 2 may be separated from the interior parcel storage station 10 where a user may gain access to said Parcel.

Associated with this alternative embodiment of the invention, a problem with separating the Mailport integrated within a building from the APC Access 7 located adjacent to the exterior to a building, such as for example on the roof of a building, when said landing site is not in direct proximity to user access points to the Mailport located within the interior of a building, is that a Parcel 2 delivered from an Automated Parcel Carrier 1 to a Mailport must be transported from the APC Access 7 to the User Receptacle through the building. An embodiment of this invention, therefore, solves this problem by incorporating mechanisms to retrieve a Parcel 2 from an exterior area of the building, transport the Parcel 2 through the building to the entrance to a Mailport located within the interior of the building at some location not directly adjacent to the APC Access 7 located adjacent to the exterior side of the building (FIG. 8). Adjacent to or otherwise incorporated within the landing area is a door opening to an I/O Receptacle 3 designed to store a Parcel 2 received from an Automated Parcel Carrier 1, and then transfer said Parcel to a Translocator Receptacle 5, or in the alternative receive a Parcel 2 from a Translocator Receptacle 5 and then transfer said Parcel to an Automated Parcel Carrier 1. In this embodiment of the invention, the Translocator Receptacle 5 functions to transport a Parcel 1 or a plurality of Parcels from the APC Access, through a building, to the User Receptacle 4 located within the building. The Translocator Receptacle 5 may travel, for example, through a shaft located within the interior of the building to accomplish the transfer of a Parcel 2 from the APC access located adjacent to or integrated within the roof of said building to an access aperture of the Mailport, or Mailport Receptacles inside said building, as illustrated by FIGS. 7 and 8.

The preferred embodiment of the present invention allows for an Automated Parcel Carrier 1 to attend to the business of delivering and receiving a Parcel 2 or a plurality of Parcels in an automated fashion without the risks associated with direct contact with humans. In the preferred embodiment of the invention, a Parcel 2 may comprise a pod specifically designed for transport by an Automated Parcel Carrier 1. For instance, where an Automated Parcel Carrier 1 is an unmanned aerial vehicle, said pod may take an aerodynamic shape to facilitate flight. Said pod may also take a specific shape for efficient transport by and/or interaction with an Automated Parcel Carrier 1.

In the preferred embodiment of the invention, one Parcel 2 or a plurality of Parcels are stored inside the Mailport after delivery. The Mailport includes mechanism to ensure that the Parcel 2 is distributed to its intended recipient on demand. There are multiple possible embodiments of the sorting and distribution mechanism that allows a recipient to receive the correct Parcel 2 or plurality of Parcels.

Figure 2:
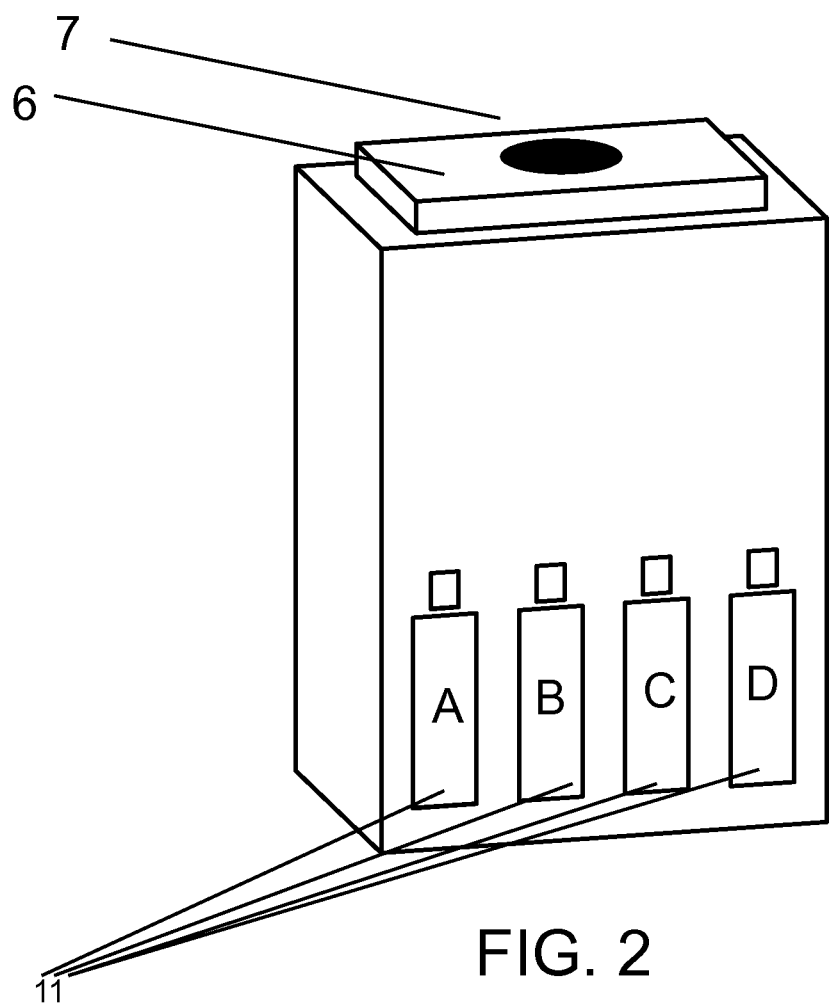
FIG. 2: an angular view of the exterior of a preferred embodiment of the invention.

In one embodiment of the invention, multiple individual units exist within the Mailport, each with individualized access to a predefined subset of human recipients and/or machine recipients, such as Automated Parcel Carrier 1, as illustrated by FIG. 2. Each recipient's Parcel 2 or a plurality of Parcels are delivered, sorted, and placed within the owner's designated unit 11. The intended recipient can access their unit via a variety of unlocking mechanisms, including a key, wireless entry mechanism, a smartphone app connected via the internet to the Mailport, or a variety of other unlocking mechanisms, to retrieve the Parcel 2 or a plurality of Parcels intended for delivery to said intended recipient.

In the preferred embodiment of the invention, the Mailport includes a Communication System. As used herein, the "Communication System" refers to a system for the Mailport to transmit outgoing communications and receive incoming communications with outside Controllers. As used herein, "Controller" refers to a human or processor-controlled decision making unit that communicates with the Mailport or Automated Parcel Carrier or a plurality of Mailports or Automated Parcel Carriers, and regulates the logistics and timing of said Automated Parcel Carriers, including, but not limited to (in the case of UAVs) landing, Parcel unloading, Parcel loading, take-off, recharging, and/or other activities related to Parcel delivery and pickup by an APC. In the preferred embodiment, the Controller is linked with the Automated Parcel Carriers, Communication System, Translocator Receptacle, and/or Mailport, and an external communication network, such as, for example, the internet. For Inbound scenarios, the Mailport uses its Communication System to ensure that a recipient of a Parcel delivered to the Mailport by an Automated Parcel Carrier 1 receives an automated notification that said recipient's Parcel has been delivered. For outbound scenarios, the Mailport uses its Communication System to notify the Controller of a Parcel pickup. In a specific instance, the Communication System transmits a communication to another distinct Mailport physically located in a distinct location, that a Parcel 2 intended for delivery to said distinct Mailport physically located in a distinct location has left the Mailport. Such communication would include information such as "the Parcel is enroute," "the Parcel has been picked up," etc. Such communication would notify another Mailport of the status, including but not limited to the location, intended direction of movement, and estimated delivery time of Parcels or Automated Parcel Carriers to and from said other Mailport. Such communication would also notify human and machine users of the status, including but not limited to the location, intended direction of movement, and estimated delivery time of Parcels.

In the preferred embodiment of the invention, the Communication System is linked with the Automated Parcel Carriers, Controllers, Translocator, and/or Mailport, and an external communication network, such as, for example, the internet, facilitating communication with the Mailport and a human or machine user prior to the delivery of cargo. This communication may include information including but not limited to a notification of arrival time, make and model of carrier, weight and size of Parcels to be delivered, identity of recipients. The Mailport can communicate back to the Automated Parcel Carrier or Controller with information including but not limited to details about docking location/type, confirmation of recipients using the Mailport, local weather conditions, accommodations for recharging/parking/repairs, and cargo to pick up. Such communication may occur via a variety of mechanisms, such as internet-based communication methodologies, bluetooth technologies, wireless technologies, light based communications, infrared transmissions, or a variety of other communication mechanisms.

In the preferred embodiment of the invention, the Communication System allows the Mailport to communicate with humans via a variety of means including but not limited to a phone call, text message, email, instant message, or other preferred communication method. Information sent to the Mailport user can include information about Parcels that are pending pickup, Parcels that are enroute, and associated information. Information associated with such communications may include information related to an access code for a User Receptacle keypad for Parcel pickup.

Figure 6:
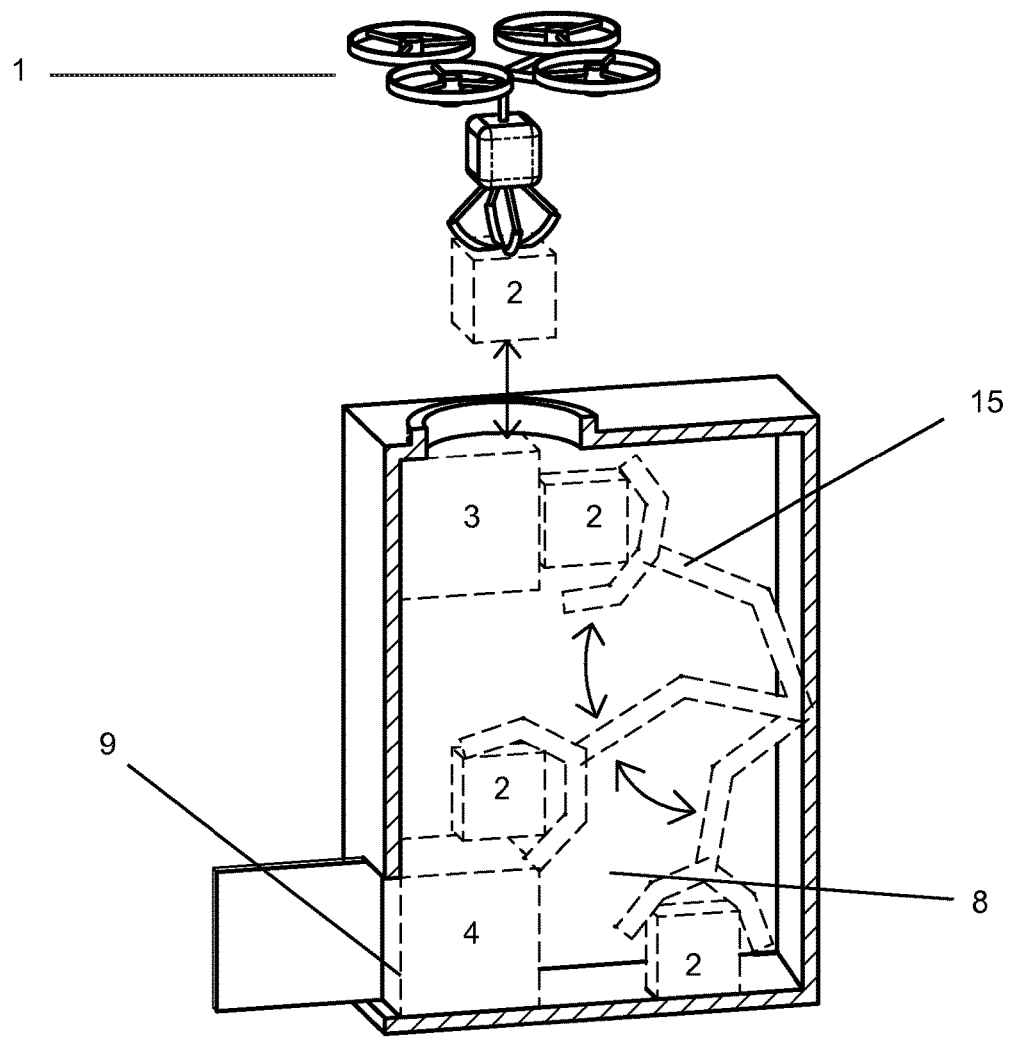
FIG. 6: a side slice view of an embodiment of the invention, additionally comprising a single robotic arm depicted in three distinct positions.

In an embodiment of the invention, a Parcel 2 or plurality of Parcels delivered to the Mailport or intended for outbound delivery from the Mailport are stored in a main holding area 8 within the Mailport, as illustrated by FIG. 6. In such embodiment, a Robotic Internal Transfer Arm 15 can transfer a parcel between the areas and enclosures within the Mailport. The present inventor has observed that the benefit to this specific embodiment is that Parcel storage space within the Mailport is not wasted by the space taken by individualized units, when such units are left empty. The present inventor has observed that a related benefit to this specific embodiment is that available space within the Mailport is not wasted by the space taken by individualized units, when such units are un-utilized or underutilized.

In an embodiment of the invention, when a human or machine recipient interacts with the Mailport to retrieve a Parcel or a plurality of Parcels, said Parcel or a plurality of Parcels is/are sorted on demand by the Mailport. The process of sorting of a Parcel or a plurality of Parcels could take place via a number of mechanisms, including bar codes, RF technology, optical character recognition, or any of a number of other sorting mechanisms. Once the appropriate packages are identified by algorithms employed by the Mailport, such packages are delivered to a single multi-user opening 9 separated from another Parcel or other Parcels, to prevent the recipient from accessing a Parcel or a plurality of Parcels not intended for the recipient, as illustrated by FIG. 6. The recipient then may retrieve only the Parcels intended for the recipient. The next user's Parcels are delivered to the same multi-user opening and so forth.

In the preferred embodiment of the invention, the Mailport incorporates an identification system to ensure that each recipient must be identified and matched to a Parcel or a plurality of Parcels intended for delivery to said recipient. This process can occur in different embodiments through various encoded identification mechanisms. Sorting and identification mechanisms to identify the recipient include but are not limited to barcodes, QR codes, fingerprint technology, personal identification numbers, retina identification, heat map identification, biometrics, voice recognition, magnetic ID devices, face recognition, and combinations of multiple ID technologies.

In an embodiment of the invention, a Parcel 2 must be physically sorted and moved after delivery to the Mailport. This process includes physical transfer internally within the Mailport between the locations of delivery, storage, and recipient pickup. Possible methods of Parcel 2 translocation include but are not limited to conveyor belts, robots, Robotic Internal Transfer Arms 15, human intervention, pulley systems, and rails. In some embodiments of the invention, the translocation of a Parcel 2 or plurality of Parcels between the location of delivery and the location of human or machine recipient retrieval may be rather distant and may require multiple types of transfer mechanisms. For a Parcel 2 or plurality of Parcels stored for subsequent transfer to another recipient at another location, in other words an outbound Parcel 2 or outbound plurality of Parcels, this process similarly includes physical transfer of said Parcel 2 or plurality of Parcels between and among designated delivery, storage, and pickup locations internally within the Mailport.

In the preferred embodiment of the invention, a Mailport acts as a "mailbox," or receptacle for delivery of an inbound Parcel 2 or a plurality of Parcels to a human or a machine recipient, or transfer of a Parcel 2 or a plurality of Parcels from a human or machine recipient for further delivery. In another embodiment of the invention, a Mailport can act as a transfer hub for a Parcel 2 or a plurality of Parcels to be dropped off by one Automated Parcel Carrier 1 and picked up by another vehicle or user for further delivery. As such, a second Automated Parcel Carrier may retrieve a package earlier delivered by a first Automated Parcel Carrier for further delivery. In still other embodiments, the Mailport can be both a mailbox and a transfer hub.

In the preferred embodiment of the invention, the identification of the a Parcel 2 or a plurality of Parcels is accomplished by mechanism incorporated into the Mailport itself. Both Intrinsic Attributes and Applied Attributes, and/or a combination thereof, of the parcel or plurality of parcels could be used to sort the said parcels or plurality of parcels. "Intrinsic Attributes," as referenced herein, refers to any qualifier for the parcel or plurality of parcels that could be used to uniquely identify and sort said items. Intrinsic Attributes could include qualities such as parcel weight, shape, dimensions, color, other qualities, or any combination thereof, that when subsequently retrieved, provide a unique identity for a particular parcel or plurality of parcels. "Applied Attributes" refers to any identifier for the parcel or plurality of parcels that can be added to the parcel or a plurality of parcels by a human or machine user. Applied Attributes could include end-destination user names, end-destination addresses, bar codes, RFID technology, serial number, other preferred qualities, or any combination thereof, that when subsequently retrieved, uniquely identifies a particular parcel or plurality of parcels.

Figure 11:
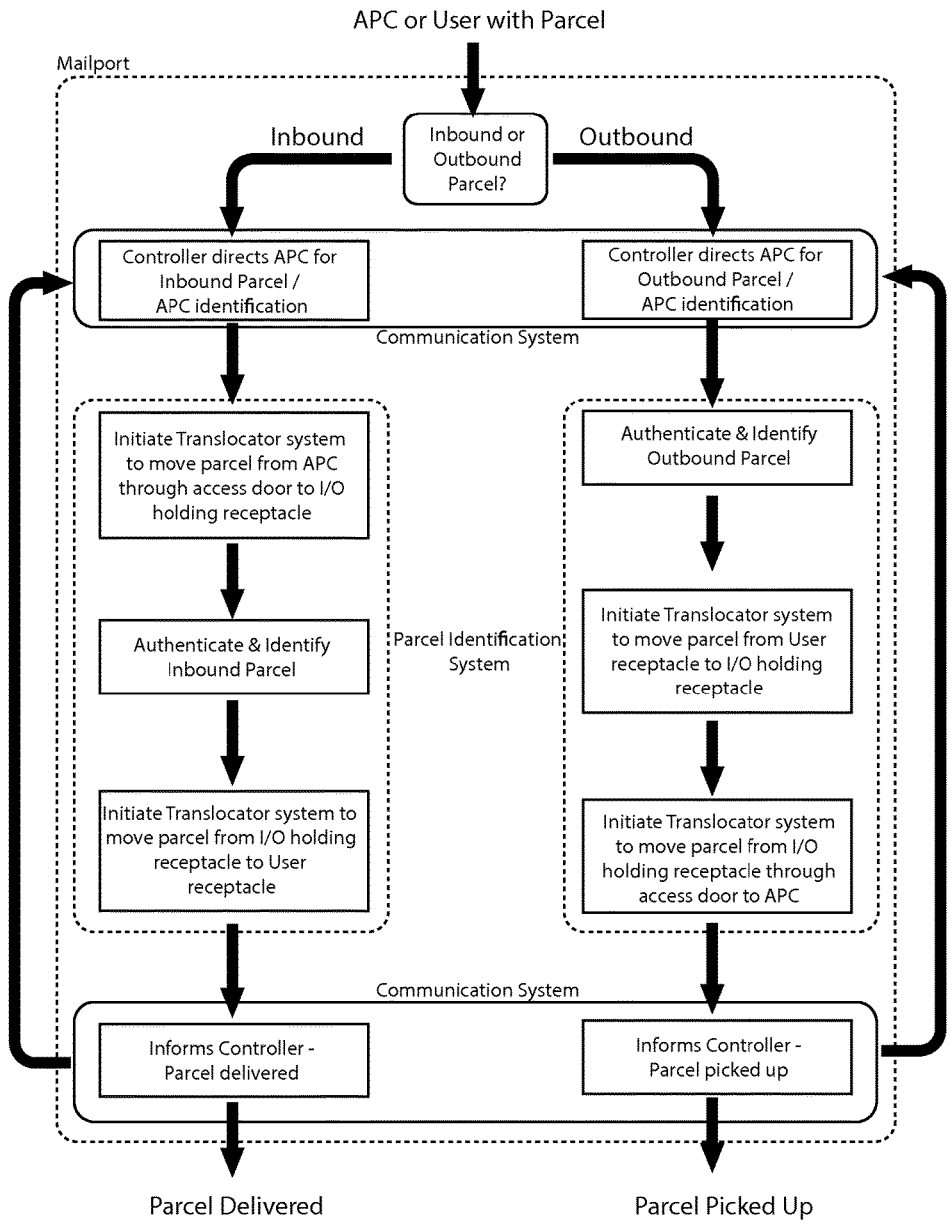
FIG. 11: Example Inbound/Outbound Parcel Handling Flow Diagram

In the preferred embodiment of the invention, the Mailport identifies a Parcel 2 or a plurality of Parcels using any of the Intrinsic Attributes and/or Applied Attributes, and/or any combination thereof. In such embodiment, the Mailport also identifies and authenticates an Automated Parcel Carrier associated with said Parcel 2 or a plurality of Parcels, and then initiates communications with a control station, recipients, other Automated Parcel Carriers and/or other Mailports as appropriate, as further illustrated in FIG. 11. In an alternate embodiment of the invention, the Mailport assigns its own Applied Attribute to said Parcel 2 or a plurality of Parcels and stores a copy of said Applied Attribute along with information about said Parcel 2 or a plurality of Parcels in a separate storage medium, such as for example a memory storage device. Subsequently, the Mailport collects Intrinsic Attributes and/or Applied Attributes of a Parcel 2 or a plurality of Parcels and then cross-references said Intrinsic Attributes and/or Applied Attributes with information maintained in a separate storage medium, such as for example a memory storage device, to identify a Parcel 2 or a plurality of Parcels. Once the Parcel 2 or a plurality of Parcels are identified by comparing the relevant Intrinsic Attributes and/or Applied Attributes to information maintained in a separate storage medium, the Mailport may transfer information pertaining to said Parcel 2 or a plurality of Parcels to the Communication System. The Communication System then notifies the relevant human or machine user of the receipt of said Parcel 2 or a plurality of Parcels by the Mailport.

In the preferred embodiment of the invention, once a Parcel 2 or a plurality of Parcels are identified by the Mailport, said Parcel 2 or a plurality of Parcels are delivered to one User Receptacle 4 or a plurality of User Receptacles 11. Each User Receptacle 4 is separated from space containing the remainder of the parcels, such as the holding area 8, as illustrated by FIG. 6. The advantage of the separation of the User Receptacle 4 from another Parcel or other plurality of Parcels not intended for a recipient is to prevent said recipient from accessing a Parcel or a plurality of Parcels not intended for said recipient. The recipient then may retrieve only the Parcel or the plurality of Parcels intended for the recipient. Another recipient's Parcel or plurality of Parcels may be delivered to the same multi-user opening 9 adjacent to User Receptacle 4 at a later time.

Figure 9:
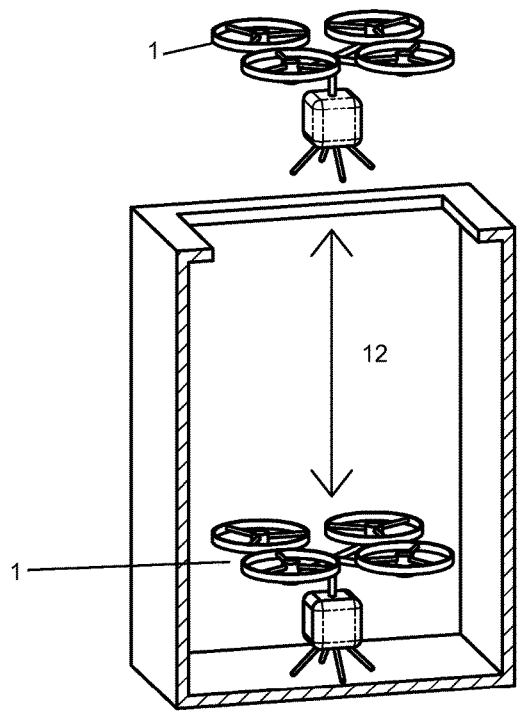
FIG. 9: a side slice view of an embodiment of the invention comprising a Parcel Enclosure for an Automated Parcel Carrier.
Figure 10:
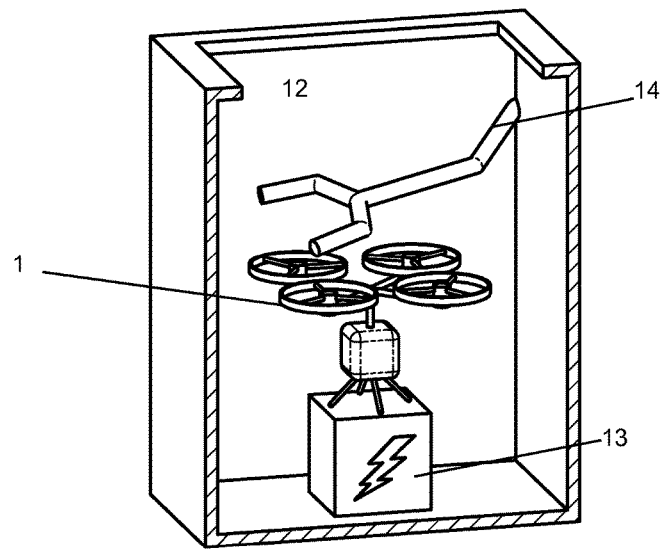
FIG. 10: a side slice view of an embodiment of the invention additionally comprising features to maintain an Automated Parcel Carrier.

Another embodiment of the invention includes an enclosed space 12 for an Automated Parcel Carrier 1 or plurality of Automated Parcel Carriers to remain for some period of time, as illustrated in FIG. 9 and FIG. 10. An Automated Parcel Carrier may require a variety of services such as minor repairs, a safe place to weather a storm, a place to remain parked when not in use, or when fueling or recharging. An embodiment of the invention incorporates an Automated Parcel Carrier recharging station 13 and Robotic Maintenance Arm 14 to accommodate recharging and repairs, respectively, as illustrated by FIG. 10. Other embodiments may include pods for liquid or gaseous fuels, and mechanisms to transfer said fuels to the Automated Parcel Carrier 1. An Automated Parcel Carrier 1 with service needs can have those needs met at a Mailport that includes functionalities to perform a variety of Automated Parcel Carrier services, such as those listed above.

Another embodiment of the invention incorporates a Mailport that is located underground, on the surface of water, or under water. Occasionally, a situation will call for a Mailport that cannot be located above ground or incorporated into a building. Various embodiments of the present invention allow for a Mailport to have a subterranean location to accommodate subterranean Automated Parcel Carriers, or to be situated near the surface of water or under water to accommodate aquatic Automated Parcel Carriers.

In the preferred embodiment of the invention, an Automated Parcel Carrier 1 that travels by air requires a method of docking with the Mailport to deliver cargo. In another embodiment, an Automated Parcel Carrier 1 that that travels by land requires a mechanism to dock with a port to deliver their cargo. Human carriers may approach the Mailport on foot or by vehicle. The present inventor has recognized that the Access Aperture into the Mailport should be implemented to accommodate a variety of human Parcel carriers and Automated Parcel Carriers in land situations. In the preferred embodiment of the invention, the Mailport includes a separate aperture tailored for the use of human carriers, such as the User Receptacles 11 as illustrated by FIG. 2, designed for a human user experience.

As of the present filing date of this application, the Federal Aviation Administration has indicated that it would begin issuing licensure for Unmanned Aerial Vehicle (UAV) deliveries for integration into the National Airspace System (NAS), by offering limited access via Certificate of Approval or Waiver (COA) based on the capabilities of particular UAVs In the preferred embodiment of the invention, the Mailport incorporates an Omni-Directional Beacon ("ODB"), a VHF Omnidirectional Range ("VOR"), a Global Positioning Satellite ("GPS") system or at least one other electronic location finding mechanism to enable an unmanned aerial vehicle to maintain a precise geospatial location, including for example specific longitudinal and latitudinal coordinates and altitude. The preferred embodiment of the invention incorporates the beacon and location-finding mechanisms in part to enable an Automated Parcel Carrier 1 or a plurality of Automated Parcel Carriers to have a much more defined and predictable airspace occupancy. In summary, by providing a localized Mailport and therefore, allocated airspace within an item carrier UAS, the current invention simplifies attainment of a COA and future approvals from the FAA.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. Also, the sequence of steps in a flow diagram or elements in the claims, even when preceded by a letter does not imply or require that sequence.

I claim:

1. A unit for inbound and outbound parcel delivery of at least one parcel carried by at least one automated parcel carrier (APC) comprising:
 a housing;
 an inbound/outbound receptacle disposed within the housing, wherein the inbound/outbound receptacle is configured to receive at least one parcel;
 a user receptacle disposed within the housing, wherein the user receptacle is configured to receive at least one parcel from the inbound/outbound receptacle;
 at least one internal holding area disposed within the housing;

a redistribution apparatus disposed within the housing and configured to translocate at least one parcel within the housing between the inbound/outbound receptacle, the user receptacle, and the internal holding area;

at least one controller connected to the inbound/outbound receptacle, the user receptacle, and the internal holding area for controlling at least translocation of at least one parcel between the inbound/outbound receptacle and the user receptacle; and a user interface providing input to the at least one controller and providing output to a user.

2. The unit of claim 1, wherein the at least one controller controls at least one of the user receptacle, the user interface, the inbound/outbound receptacle, an APC function, or the redistribution apparatus.

3. The unit of claim 1, wherein the internal holding area is an internal intermediate receptacle.

4. The unit of claim 1, wherein the at least one controller controls the redistribution apparatus for translocation of the at least one parcel between the inbound/outbound receptacle and the user receptacle.

5. The unit of claim 1, wherein the housing further comprises an APC-accessible aperture in communication with the inbound/outbound receptacle.

6. The unit of claim 1, further comprising a docking location configured to receive an APC for transfer of at least one parcel between the APC and the housing.

7. The unit of claim 1, further comprising a user-accessible aperture in communication with the user receptacle.

8. The unit of claim 7, wherein the user-accessible aperture is controlled via the at least one controller.

9. The unit of claim 7, wherein the user-accessible aperture is a multiuser-accessible aperture.

10. The unit of claim 1, wherein the redistribution apparatus comprises a translocation receptacle.

11. The unit of claim 10, wherein the translocation receptacle comprises a floor movable between flat, lift, and sloped positions.

12. The unit of claim 1, wherein at least one of the inbound/outbound receptacle and the user receptacle comprises a floor movable between flat, lift, and sloped positions.

13. The unit of claim 1, wherein the redistribution apparatus comprises at least one robotic arm.

14. The unit of claim 1, wherein the housing is configured to secure the unit from unauthorized access.

15. The unit of claim 1, wherein the at least one controller further controls parcel identification for at least one of the inbound/outbound receptacle or the user receptacle.

16. The unit of claim 1, wherein in outbound use:
the user interface is configured to receive a user's input for accessing a user receptacle, wherein the user receptacle is configured to receive at least one parcel;
the at least one controller is configured to instruct the redistribution apparatus to translocate the at least one parcel from the user receptacle to the inbound/outbound receptacle;
the at least one controller is configured to communicate with an APC; and
the APC is configured to obtain the at least one parcel from the inbound/outbound receptacle.

17. The unit of claim 16, wherein in outbound use:
the at least one controller is further configured to instruct the redistribution apparatus to translocate the at least one parcel from the user receptacle to the internal holding area, and is subsequently configured to instruct the redistribution apparatus to translocate the at least one parcel from the internal holding area to the inbound/outbound receptacle.

18. The unit of claim 1, wherein in inbound use:
a parcel-bearing APC is configured to communicate with the at least one controller and to engage a docking location in communication with the inbound/outbound receptacle;
the APC is configured to release or places at least one parcel at or in an inbound/outbound aperture disposed within the housing; and
the at least one controller is configured to instruct the redistribution apparatus to translocate the at least one parcel to the user receptacle or to the internal holding area.

19. The unit of claim 18, wherein in inbound use:
the user interface is configured to relay user inputs to the at least one controller;
if the at least one parcel is not already positioned in the user receptacle, the at least one controller is configured to instruct the redistribution apparatus to translocate the at least one parcel to the user receptacle; and
a user-accessible aperture is configured to provide access for retrieval of the at least one parcel from the user receptacle.

20. The unit of claim 19, wherein the at least one controller requires a user authentication to allow retrieval of the at least one parcel from the user receptacle.

21. A system of units for inbound and outbound parcel delivery of at least one parcel carried by at least one automated parcel carrier (APC), comprising:
an external housing comprising a plurality of units, wherein each unit in said plurality of units comprises:
a housing;
an inbound/outbound receptacle disposed within the housing, wherein the inbound/outbound receptacle is configured to receive at least one parcel;
a user receptacle disposed within the housing, wherein the user receptacle is configured to receive at least one parcel from the inbound/outbound receptacle;
at least one internal holding area disposed within the housing;
a redistribution apparatus disposed within the housing and configured to translocate at least one parcel within the housing between the inbound/outbound receptacle, the user receptacle, and the internal holding area;
at least one controller connected to the inbound/outbound receptacle, the user receptacle, and the internal holding area for controlling at least translocation of at least one parcel between the inbound/outbound receptacle and the user receptacle; and
a user interface providing input to the at least one controller and providing output to a user.

22. The system of claim 21, wherein the at least one controller is configured to communicate with at least one unit in the plurality of units.

* * * * *